(12) United States Patent
Salem et al.

(10) Patent No.: US 10,400,901 B2
(45) Date of Patent: Sep. 3, 2019

(54) VALVES AND METHODS OF ACCESS

(71) Applicants: Henry Barkley Salem, Kingwood, TX (US); Larry Dean Ray, Baytown, TX (US)

(72) Inventors: Henry Barkley Salem, Kingwood, TX (US); Larry Dean Ray, Baytown, TX (US)

(*) Notice: Subject to any disclaimer, the term of this patent is extended or adjusted under 35 U.S.C. 154(b) by 0 days.

(21) Appl. No.: 15/530,846

(22) Filed: Mar. 7, 2017

(65) Prior Publication Data

US 2017/0335977 A1 Nov. 23, 2017

Related U.S. Application Data

(60) Provisional application No. 62/392,001, filed on May 17, 2016.

(51) Int. Cl.
*F16K 5/06* (2006.01)
*F16K 27/06* (2006.01)

(52) U.S. Cl.
CPC .......... *F16K 5/0631* (2013.01); *F16K 5/0642* (2013.01); *F16K 27/067* (2013.01)

(58) Field of Classification Search
CPC .... F16K 5/0631; F16K 5/0642; F16K 27/067; F16K 5/0626; F16K 5/0636; Y10T 137/0508
USPC ........... 251/316, 180, 315.01, 315.1, 315.11, 251/315.12; 137/15.22
See application file for complete search history.

(56) References Cited

U.S. PATENT DOCUMENTS

| | | | |
|---|---|---|---|
| 1,906,266 A | 5/1933 | Hoffman | |
| 1,919,653 A | 7/1933 | Hill | |
| 2,744,720 A | 5/1956 | Wilms | |
| 3,071,900 A | 1/1963 | Balz | |
| 3,146,988 A | 9/1964 | Riopelle et al. | |
| 3,771,545 A * | 11/1973 | Allen | F16K 5/0673 137/315.21 |
| 4,072,161 A | 2/1978 | Schoeneweis et al. | |
| 4,262,688 A * | 4/1981 | Bialkowski | F16K 5/0663 137/242 |
| 4,265,408 A | 5/1981 | Voelskow | |
| 4,281,680 A | 8/1981 | Ripert | |
| 4,617,957 A | 10/1986 | Sandling | |
| 4,802,652 A | 2/1989 | Kaniut et al. | |
| 5,088,687 A | 2/1992 | Stender | |
| 5,312,051 A | 5/1994 | Preisser | |
| 5,471,692 A | 12/1995 | Wasinger | |
| 5,595,349 A | 1/1997 | Bergstrom | |
| 5,614,094 A | 3/1997 | Deister et al. | |
| 5,664,760 A | 9/1997 | Army, Jr. et al. | |
| 5,921,401 A | 7/1999 | Johnston | |
| 6,039,069 A | 3/2000 | Gonsior et al. | |
| 6,079,568 A | 6/2000 | Loshe | |
| 6,156,083 A | 12/2000 | Dial | |
| 6,238,516 B1 | 5/2001 | Watson | |
| 6,315,837 B1 | 11/2001 | Barclay | |

(Continued)

*Primary Examiner* — Kevin F Murphy
*Assistant Examiner* — Kelsey E Cary
(74) *Attorney, Agent, or Firm* — Nolte Intellectual Property Law Group (57) ABSTRACT

Valves with a removable central section for access to parts of the valve, the valve securable between corresponding ends of a line, e.g. a flowline, process fluid line, or pipeline; such valves which are ball valves; and methods to access parts of a valve and/or a line interior.

11 Claims, 6 Drawing Sheets

(56) References Cited

U.S. PATENT DOCUMENTS

| | | | |
|---|---|---|---|
| 6,367,134 B1 | 4/2002 | Sanada | |
| 6,508,699 B1 | 1/2003 | Santoriello | |
| 6,568,410 B1 | 5/2003 | Teruggi | |
| 6,726,177 B2 | 4/2004 | Wang | |
| 6,821,060 B2 | 11/2004 | McTurk et al. | |
| 7,497,337 B2 | 3/2009 | Tse | |
| 7,850,143 B1 * | 12/2010 | Rosada | F16K 5/0631 |
| | | | 251/121 |
| 7,938,272 B2 | 5/2011 | Anila | |
| 8,317,904 B2 | 11/2012 | Sarshar | |
| 8,601,634 B1 * | 12/2013 | Stunkard | F16L 55/46 |
| | | | 137/268 |
| 8,783,657 B2 | 7/2014 | Yang et al. | |
| 8,789,780 B2 | 7/2014 | Brosseuk | |
| 9,464,716 B2 | 10/2016 | Gerceker | |
| 9,541,203 B2 | 1/2017 | Dalluge | |
| 2007/0252102 A1 * | 11/2007 | Kemp | F16K 5/0694 |
| | | | 251/180 |
| 2008/0093575 A1 * | 4/2008 | Church | F16K 5/0605 |
| | | | 251/315.16 |
| 2011/0100068 A1 | 5/2011 | Simsek | |
| 2013/0312832 A1 * | 11/2013 | Avdjian | F16K 5/0605 |
| | | | 137/1 |
| 2016/0186870 A1 * | 6/2016 | Ricard | F16K 5/0689 |
| | | | 251/180 |

\* cited by examiner

VALVES AND METHODS OF ACCESS

RELATED APPLICATIONS

Under the Patent Laws of the United States, this application claims the benefits, including but not limited to the benefit of the filing date and of priority claim, of prior filed U.S. Application Ser. No. 62/392,001 filed May 17, 2016, which application is incorporated fully herein for all purposes.

BACKGROUND OF THE INVENTION

Field of the Invention

The present invention is directed to: valves, valves with a removable central section, methods of accessing parts of valves and/or of a flowline, and, in certain particulars, ball valves with a removable central section which contains a ball and valve seats.

Description of Related Art

There are a wide variety of known valves, ball valves, valves with removable parts, and methods of accessing internal parts of a valve.

SUMMARY OF THE INVENTION

The present invention, in certain aspects, provides a valve with a body and a removable center section, the valve being releasably securable in a flowline so that the central section is removable without disconnecting the body from the flowline. The body and the center section each has a fluid flow channel through it for the flow of fluid from the flowline through the valve.

In certain aspects, the valve is a ball valve and the central section (or "center section") contains, among other things, a movable ball and a seat or seats for the ball, providing unidirectional sealing (one sealing set) or bidirectional sealing (upstream and downstream sealing). Additionally, the center section contains a spring or springs to bias a seat, e.g. an upstream sealing seat (if present), a downstream seat, or both. Upon removal of the center section from the valve body, all these parts can be inspected and, if needed, repaired or replaced. Also, if the channel through the center section is worn or damaged, it can be refurbished or resurfaced, or the entire center section can be replaced.

In certain aspects, a sealing seat structure has a body with a recess, indentation, or part for holding a sealing gasket. In certain particular embodiments, separation of the center section of the valve from the valve body is accomplished with minimal spreading of the valve body apart from the center section. For example, in one particular aspect, the valve body has two halves, each half connected to a process flowline with the center section between the two body halves, and the two body halves separable to permit removal of the center section. This is done with separation between the valve body and each line end connection of between 0.090 inches and 0.030 inches, and, in one particular aspect, with about one-eighth inch separation between each body half and an adjacent end of a flowline.

Such valve removal is advantageous in that no pre-removal heating of line/valve-body welds is needed and no cutting of welds is required to remove desired parts of the valve. Then, to replace the valve or parts of it, no further welding is needed. Valve center section removal can also provide access to the interior of a flowline.

Certain valves according to the present invention may be used to control the flow of a wide variety of fluids in a wide variety of applications; e.g., but not limited to erosive fluid flow, corrosive fluid flow, fluid with entrained solids, fluid flowing at relatively high temperature (e.g. but not limited to, 1000 degrees F. or more), and fluid flowing at relatively high pressure. Such fluids may be liquid, vapor, flowable solids, or a mixture of any of these. Such fluids may be encountered in a variety of industries, including, but not limited to, applications in the mining, refining, chemical, petrochemical, oil & gas, and power generation industries.

Accordingly, the present invention includes features and advantages believed to enable it to advance valve technology and access to internal parts of a valve. Characteristics and advantages of the present invention described above and additional features and benefits will be readily apparent to those skilled in the art upon consideration of the following detailed description of preferred embodiments and referring to the accompanying drawings.

What follows are some of, but not all, the objects of this invention. In addition to the specific objects stated below for at least certain embodiments of the invention, there are other objects and purposes which will be readily apparent to one of skill in this art who has the benefit of this invention's creative teachings and new and nonobvious disclosures.

It is, therefore, an object of at least certain embodiments of the present invention to provide: New, useful unique, efficient, effective and nonobvious valves with a removable central section to permit access to various parts of the valve, e.g., but not limited to, an internal ball and/or seats for a valve member;

Such valves in which a removable section is releasably secured between two flanged parts of a flowline; and Such valves whose central section is removable with minimal separation form flowline components between which it is situated, e.g., but not limited to, a separation of about one-eighth of an inch.

To one of skill in this art who has the benefits of this invention's teachings and creative aspects, other purposes will be appreciated from the descriptions herein when taken in conjunction with the drawings.

The detail in these descriptions is not intended to thwart this patent's object to claim this invention no matter how others may later disguise it by variations in form, changes, or additions of further improvements.

It will be understood that the various embodiments of the present invention may include one, some, or any possible combination of the disclosed, described, and/or enumerated features, aspects, elements, and/or improvements and/or technical advantages of this invention.

BRIEF DESCRIPTION OF THE SEVERAL VIEWS OF THE DRAWINGS

A more particular description of certain embodiments of the invention briefly summarized above may be had by references to the embodiments which are shown in the drawings which form a part of this specification. These drawings illustrate embodiments of the present invention and are not to be used to improperly limit the scope of the invention which may have other equally effective or legally equivalent embodiments.

Certain embodiments of the invention are shown in the above-identified figures and described in detail below. Various aspects and features of embodiments of the invention are described below. Any combination of aspects and/or features described below can be used except where such aspects and/or features are mutually exclusive.

It should be understood that the appended drawings and description herein are of certain embodiments and are not intended to limit the invention. On the contrary, the intention is to cover all modifications, equivalents and alternatives falling within the spirit and scope of the invention as defined by the appended claims. In showing and describing these embodiments, like or identical reference numerals are used to identify common or similar elements.

The figures are not necessarily to scale and certain features and certain views of the figures may be shown exaggerated in scale or in schematic in the interest of clarity and conciseness.

As used herein the various portions (and headings), the terms "invention", "present invention" and variations thereof mean one or more embodiments, and are not intended to mean the claimed invention of any particular embodiment. So long as they are not mutually exclusive or contradictory, any aspect or, or features of any embodiment disclosed herein may be used in any other embodiment disclosed herein.

The present invention includes a variety of aspects, which may be combined in different ways. This description should further be understood to support and encompass descriptions and claims of all the various embodiments, systems, techniques, methods, devices, and applications with any number of the disclosed elements, with each element alone, and also with any and all various possible permutations and combinations of some or of all elements in this or any subsequent application.

DETAILED DESCRIPTION OF SOME
EMBODIMENTS OF THE INVENTION

In one embodiment of the present invention, the valve according to the present invention is a ball valve which is a metal-seated floating ball valve with a removable center body section that contains a metal-to-metal sealing ball and a seat, seats, a seat set, or seat sets which is/are repairable/replaceable. The floating metal-seated ball valve has a body which contains the ball, with the ball being seat-supported, sealing with the seat(s) energized with spring(s), the body including two independent end connections. The seat(s) are lapped to the ball providing corresponding mating ball and seat sealing surfaces.

The valve center section is sealingly interfaced to the end connections with gaskets. The gaskets are used to seal the end connections to the body and to the seats and body. The ball is operated by a stem which protrudes through the body and a packing chamber. The stem is contained by the use of collars and/or shoulder. The center body section can be removed to access and to repair/replace components without removal of the end connections from the service line.

The valve, valve body, center section, stem, and other parts may be made of any suitable material, including but not limited to, suitable metal, steel, suitable stainless steel, molybdenum, molybdenum alloy, and reinforced composite material of appropriate strength, including non-metal materials stronger than steel.

Figure 1:
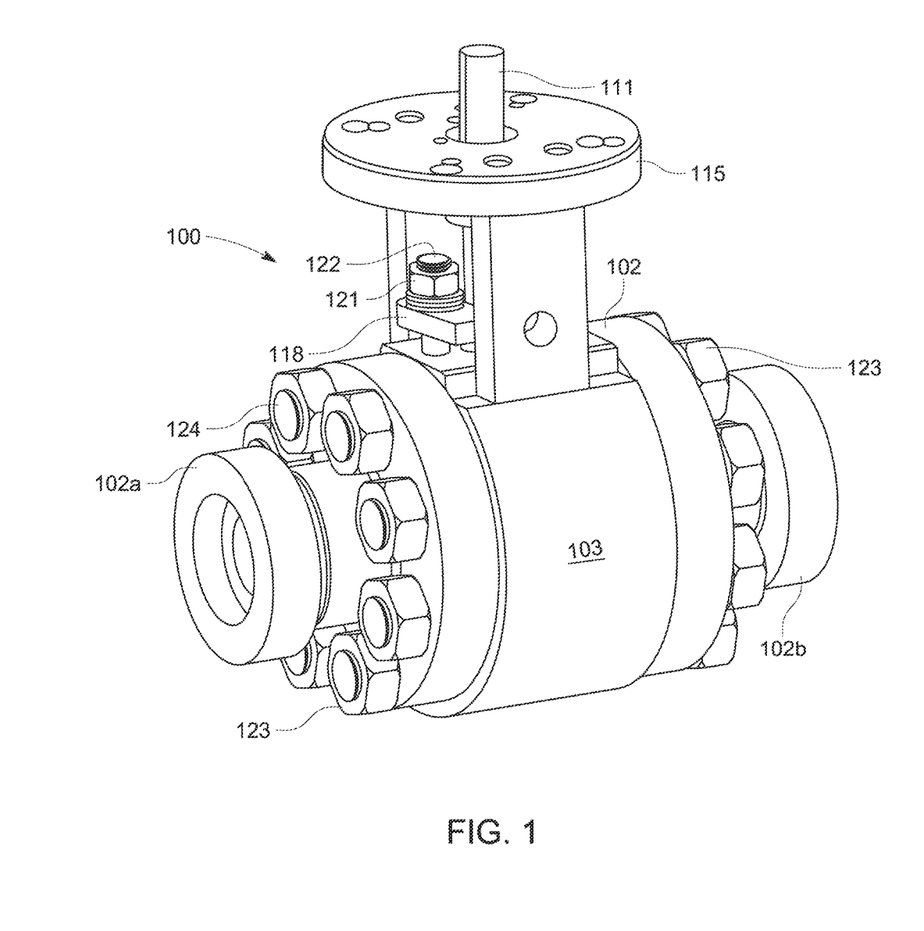
FIG. 1 is a perspective view of a valve according to the present invention.
Figure 2:
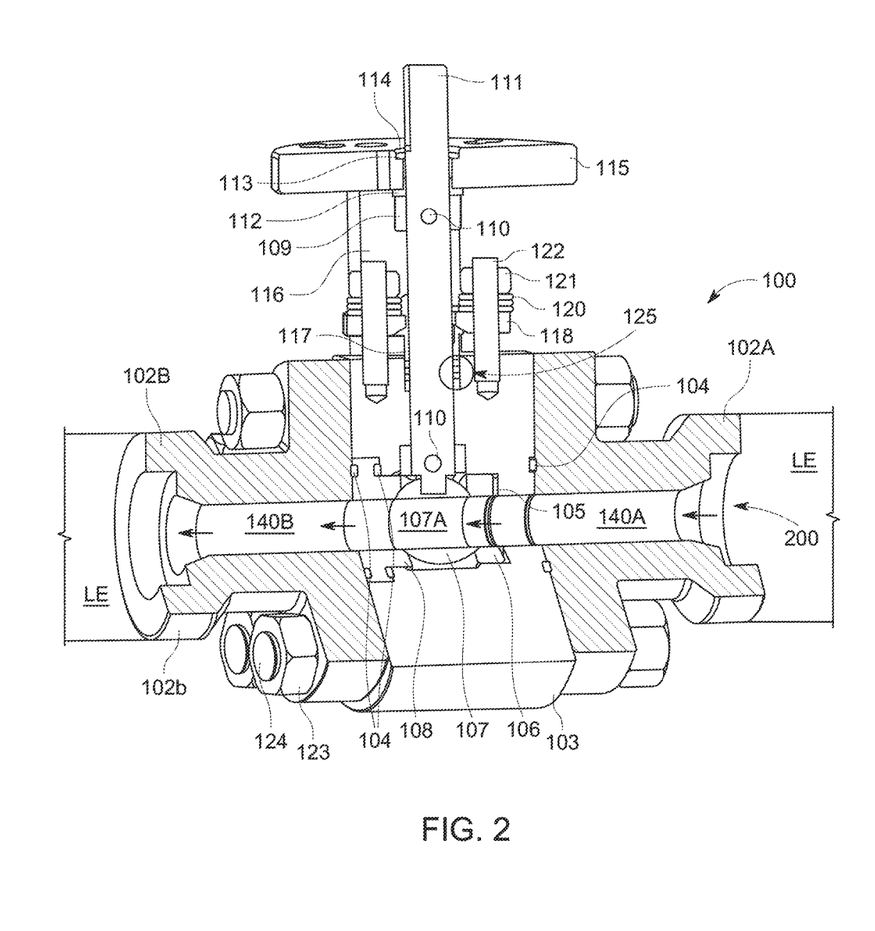
FIG. 2 is a crosssection view of the valve of FIG. 1.

FIGS. 1 and 2 show such a valve, a valve 100 according to the present invention, which has a valve body 102 with end connections 102a, 102b between which is releasably secured a center section 103. There is a fluid conducting bore 140 through the valve body with a corresponding fluid conducting bore 142 through the center section 103. A ball 107 has a fluid bore 107a therethrough which, when aligned with and in fluid communication with bores of seats, to be described below, permits fluid flow through the valve. The ball 107 is shown with the valve 100 in an "open" position for fluid flow in FIG. 2.

Bolts 124 and nuts 123 secure the center section 103 between the end connections 102a, 102b, the bolts extending through corresponding holes in each end connection and the center section.

FIG. 2 shows a line LE through which fluid flows. The valve 100 is positioned between and connected to ends of the line LE which may be any appropriate line, flowline, pipeline, process flow line, or fluid flow conduit.

As shown in FIGS. 2-6, the valve 100 has, within the bore 107a of the center section 103, an upstream seat 106, a spring 105, and a downstream seat 108, which may be a primary sealing seat for the valve. The downstream seat 108 has a flange seat 108a which may be a seat surface, shoulder or recess or part corresponding to the shape and size of a flange providing a surface for the flange to abut the seat 108; and the seat 108 carries sealing gasket(s) 104. The spring 105 biases the seat 106 against the ball 107, and the ball 107 against the seat 108.

A stem 111 extends through a mounting flange 115 and into and through a channel 103c in the center section 103. The ball 107 has a hole 107b which receives a correspondingly-shaped end 111a of the stem 111 so that rotation of the stem 111 rotates the ball 107 to open and close the valve 100. The mounting flange 115 is secured to a mount member 144 which includes a lower flange 146 through which extend bolts 122 which extend into holes 103h in the center section to releasably secure the stem 111 and associated structure to the center section 103. The bolts 122 also pass through holes 118a in an articulating gland flange 118 which presses down on a packing follower 117 which, in turn, presses down on packing 125 which seals the stem-111/channel-103c interface. Springs 120 effect desired loading on the packing follower 117 and the packing 115.

The stem 111 passes through collars 109 which facilitate desired positioning and stability of the stem 111 in the channel 103c. Collar pins 110 secure the stem to the collars 109. The stem 111 passes through a stem bushing 112 which is held in between flange 115 and collar 109 Stem bearing 113 and snap ring 114 keep the stem 111 from being pushed down into the ball 107 during an actuation assembly.

Figure 3:
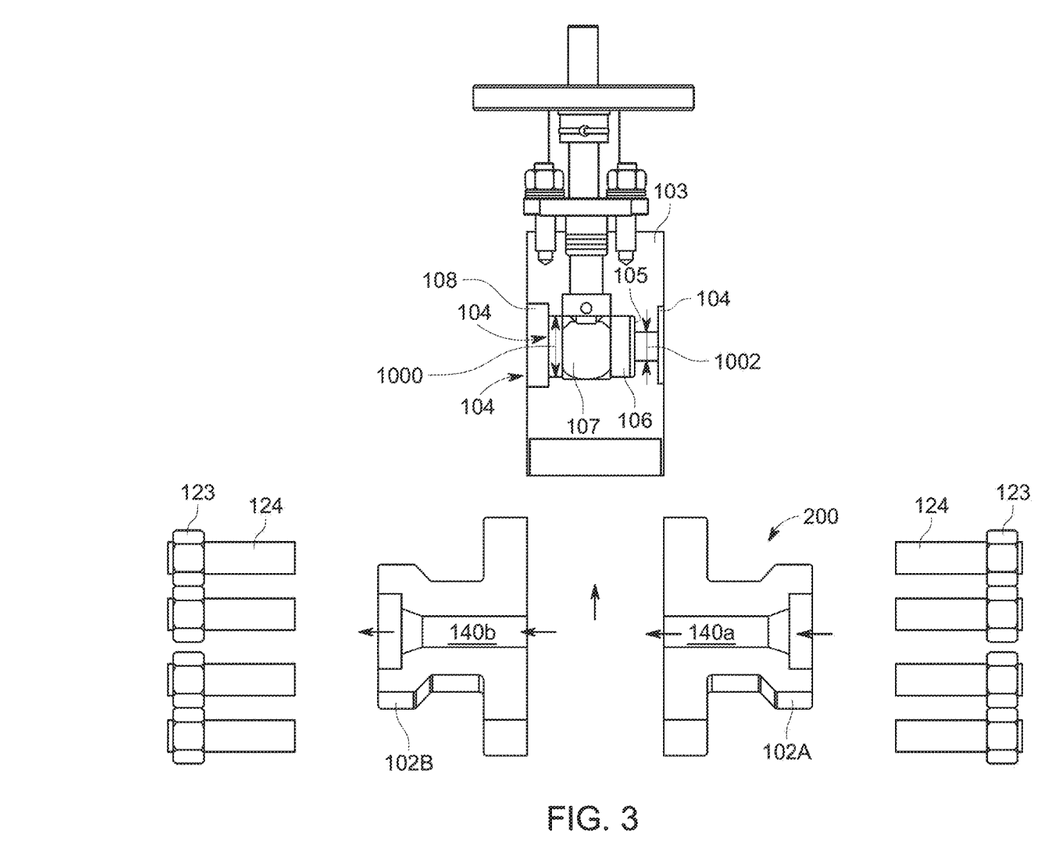
FIG. 3 is a crosssection view of the valve of FIG. 1 showing a central section removed.
Figure 4:
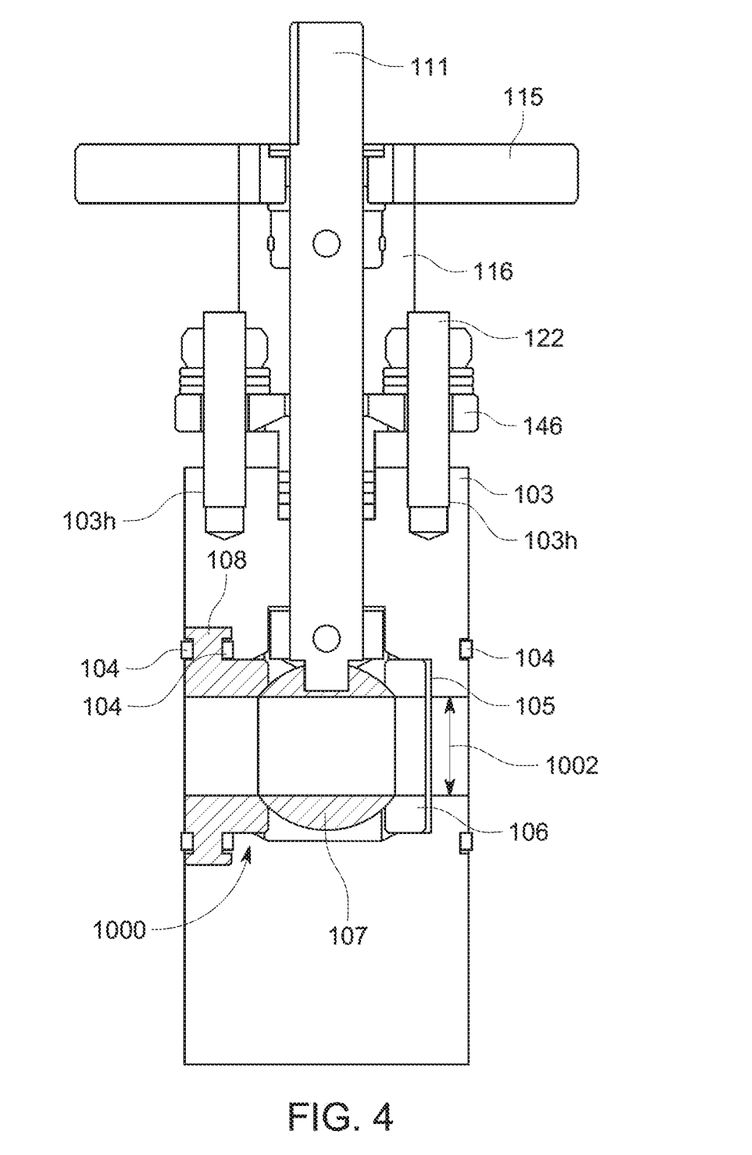
FIG. 4 is a crosssection view showing the removed central section of the valve.

FIG. 3 shows the center section 103 removed from the valve 100. The bolts 124 have been removed and the end connections 102 have been separated (e.g. one-eighth inch or between 0.090 and 0.130 inches) to permit the center section 103, with all the parts and components therein, to be removed. No weld removal and no cutting of any part is required for the removal of the center section 103. FIG. 4 depicts a cross section view showing the removed central section of the valve. A central bore 1000 and a center channel 1002 are shown in FIG. 4.

Figure 5:
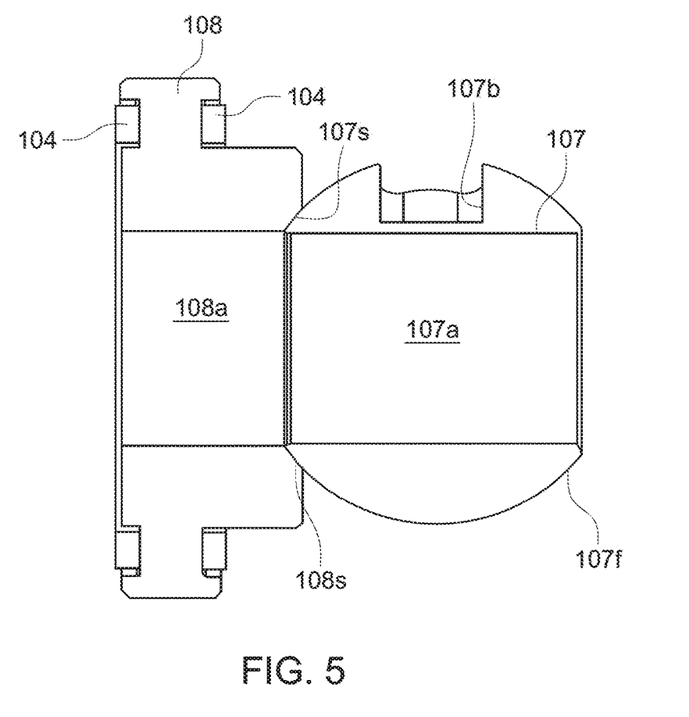
FIG. 5 is a crosssection view of the ball and related structure of the valve of FIG. 1.

FIG. 5 shows the ball 107 with its flow channel 107a; and the downstream seat 108 with a fluid flow channel 108a which is in fluid communication with the fluid flow channel 107a when the valve 100 is in an open position. Surface 107s of the ball 107 seats against the seating surface 108s of the seat 108. Surface 107f of the ball 107 seats against seating surface 106f (see FIG. 2) of the upstream seat 106.

Figure 6:
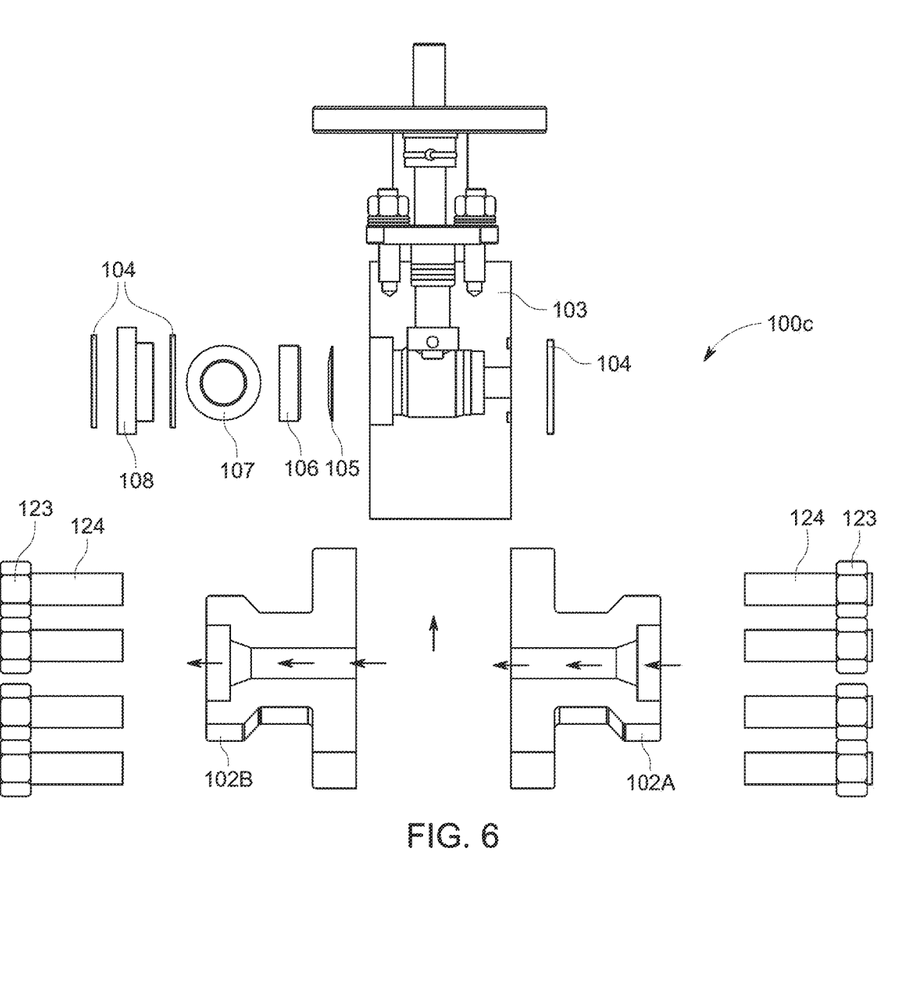
FIG. 6 is a crosssection view of the valve of FIG. 1, similar to the view of FIG. 2, but with some parts of the central section shown separated from the central section.

FIG. 6 shows several parts of the valve 100 removed from the center section 103, including: sealing gaskets 104, seat 108, ball 107, seat 106, and spring 105. Following removal of the center section 103, these parts have been removed from the center section 103; e.g. for inspection, repair, or replacement.

In certain aspects, the present invention provides a method for the removal of certain parts of a valve according to the present invention. Such a method, in one aspect, is for a valve that is not a ball valve. Such a method, in one aspect; is for a valve that is a ball valve. Such a method, in one aspect, for a valve like the valve 100, includes: removing the bolts 124; spreading the end connections 102a, 102b to permit center section removal; lifting the center section 103 from between the end connections 102a, 102b; removing the sealing seat 108 with the contained gaskets 104; removing ball the 107; removing the upstream seat 106; removing the spring 105 (or springs, if present); and removal of the body gaskets 104 from the seat 108. Such a method may include: replacing the sealing gasket(s) 104; replacing the spring(s) 105; replacing the upstream seat 106; replacing the ball 107; replacing the sealing seat 108 with sealing gaskets 104 placed in respective gasket grooves in the seat 108; replacing the center section 103; and/or replacing the bolts 124 at torque to specifications.

In conclusion, therefore, the present invention, certain embodiments disclosed herein and those covered by the appended claims are well adapted to obtain the ends set forth. Certain changes can be made in the subject matter without departing from the spirit and the scope of this invention. It is intended that each element or step recited herein is to be understood as referring to the step literally and/or to all equivalent elements or steps.

It is intended to cover the invention as broadly as legally possible in whatever form it may be utilized. The invention described herein is new and novel in accordance with 35 U.S.C. Section 102 and satisfies the conditions for patentability in 35 U.S.C. Section 102. The invention described herein is not obvious in accordance with 35 U.S.C. Section 103 and satisfies the conditions for patentability in 35 U.S.C. Section 103. The inventor may rely on the Doctrine of Equivalents to determine and assess the scope of the invention. All patents and applications identified herein are incorporated fully herein for all purposes.

The word "comprising," used in its non-limiting sense, means that items following it are included and items not specifically mentioned are not excluded. Reference to an element by the indefinite article "a" does not exclude the possibility that more than one of the element is present, unless the context clearly requires that there be only one of the elements.

What is claimed is:

1. A valve comprising:
    a valve body including:
        a first end connection with a first flow channel therethrough and a second end connection with a second flow channel therethrough; the first end connection spaced apart from the second end connection, each end connection connectible to a flowline through which fluid flows; and
        a center section connected to and between the first end connection and the second end connection, the center section having a center bore having a center channel, the center channel in fluid communication with the first flow channel and the second flow channel, fluid is flowable to and through the first channel, then to and through the center channel and then to and through the second flow channel to exit from the valve; the center section disconnectible from the first and second end connections and selectively removable from between the first and second end connections, while the first and second end connections are connected to the flowline;
        rotatably located in the center bore is a floating ball; selectively alignable with the center channel to permit fluid flow through the valve;
        the center section further comprising two spaced-apart valve seats within the center bore comprising an upstream seat having a smooth outer circumference, the upstream seat spaced apart from a downstream seat; an outermost diameter of the downstream seat is larger than an outermost diameter of the upstream seat;
        the floating ball positioned between the opposing valve seats;
        each valve seat comprising a sealing seat for the floating ball;
        a spring biased against the upstream seat thereby urging the upstream seat against the floating ball and the floating ball against the downstream seat; and
    the center section with the floating ball and the valve seats within the center section selectively removable from between the first and second end connections while the first and second end connections are fluidly connected to the flowline.

2. The valve of claim 1, wherein
    the valve seats are metal, and
    the center section is removable from between the end connections with no weld removal and with no cutting of any part of the valve.

3. The valve of claim 1, wherein the valve seats support the valve member.

4. The valve of claim 1, wherein the end connections and the center section have bolt holes, and bolts through the bolt holes releasably secure the center section to and between the end connections.

5. The valve of claim 4, wherein the bolts are removable so that removing the bolts will free the center section from the end connections making possible the separation of the end connections away from the center section while the end connections are connected to the flowline and facilitating removal of the center section from between the end connections.

6. The valve of claim 5, wherein the end connections are separable away from the center section by between 0.090 and 0.130 inches to facilitate removal of the center section.

7. The valve of claim 4, wherein removing the bolts makes possible separation of the end connections away from the center section and removal of the center section from between the end connections, the end connections remaining connected to the flowline, without any weld removal and without cutting of any part of the valve.

8. The valve of claim 1, further comprising the downstream valve seat having a flange abutting a part of the center section, and a sealing gasket, abutting the flange and between the flange and the part of the center section, the sealing gasket sealing a flange/center-section interface.

9. The valve of claim 1, further comprising a stem channel through the center section, a stem extending through the stem channel to the valve member and the stem engaged with the valve member, the stem for selectively rotating the valve member to open and close the valve to fluid flow therethrough.

10. The valve of claim 9, further comprising packing abutting the stem for sealing an interface between the stem and an interior of the stem channel.

11. The valve of claim 1, wherein the center bore is sized, configured and located so that the valve seats and the valve member are removable from the center section through the center bore.

* * * * *